United States Patent
Kashiwagi

(10) Patent No.: US 7,600,784 B2
(45) Date of Patent: Oct. 13, 2009

(54) OCCUPANT'S LEG RESTRAINT SYSTEM

(75) Inventor: Daisuke Kashiwagi, Tokyo (JP)

(73) Assignee: Takata Corporation, Tokyo (JP)

( * ) Notice: Subject to any disclaimer, the term of this patent is extended or adjusted under 35 U.S.C. 154(b) by 173 days.

(21) Appl. No.: 11/584,609

(22) Filed: Oct. 23, 2006

(65) Prior Publication Data

US 2007/0090632 A1     Apr. 26, 2007

(30) Foreign Application Priority Data

Oct. 24, 2005     (JP) .............................. 2005-308207

(51) Int. Cl.
*B60R 21/16*     (2006.01)

(52) U.S. Cl. .................... 280/743.2; 280/729; 280/751; 280/752

(58) Field of Classification Search ................. 280/729, 280/730.1, 732, 743, 743.2, 752, 753
See application file for complete search history.

(56) References Cited

U.S. PATENT DOCUMENTS 6,752,417 B2 *   6/2004  Takimoto et al. ......... 280/730.1
6,916,039 B2 *   7/2005  Abe ........................... 280/729
7,314,231 B2 *   1/2008  Abe et al. ................. 280/730.1
7,322,599 B2 *   1/2008  Abe et al. ................. 280/730.1
7,350,801 B2 *   4/2008  Nakayama ............... 280/730.1
2002/0190509 A1  12/2002  Higashi
2005/0110244 A1   5/2005  Wheelwright et al.
2005/0230939 A1  10/2005  Abe et al.

FOREIGN PATENT DOCUMENTS

| DE | 298 07 424 U1 | 10/1998 |
|---|---|---|
| EP | 1 300 300 A1 | 7/2001 |
| EP | 1 262 378 | 5/2002 |
| EP | 1 510 420 A2 | 3/2004 |
| EP | 1 514 742 A1 | 7/2004 |
| EP | 1 518 762 A1 | 9/2004 |
| JP | H10-315894 | 12/1998 |
| JP | H110115673 | 4/1999 |
| JP | 2005-75142 | 3/2005 |

* cited by examiner

*Primary Examiner*—Toan C To
(74) *Attorney, Agent, or Firm*—Manabu Kanesaka

(57) ABSTRACT

An occupant's leg restraint system includes an airbag to be inflated forward of legs of an occupant in a vehicle, a gas generator that generates gas to inflate the airbag, and at least one tether sewn to the airbag and located inside the airbag. A tether protection member is disposed between the gas generator and the tether in the airbag to protect the tether from the gas ejected from the gas generator.

11 Claims, 3 Drawing Sheets

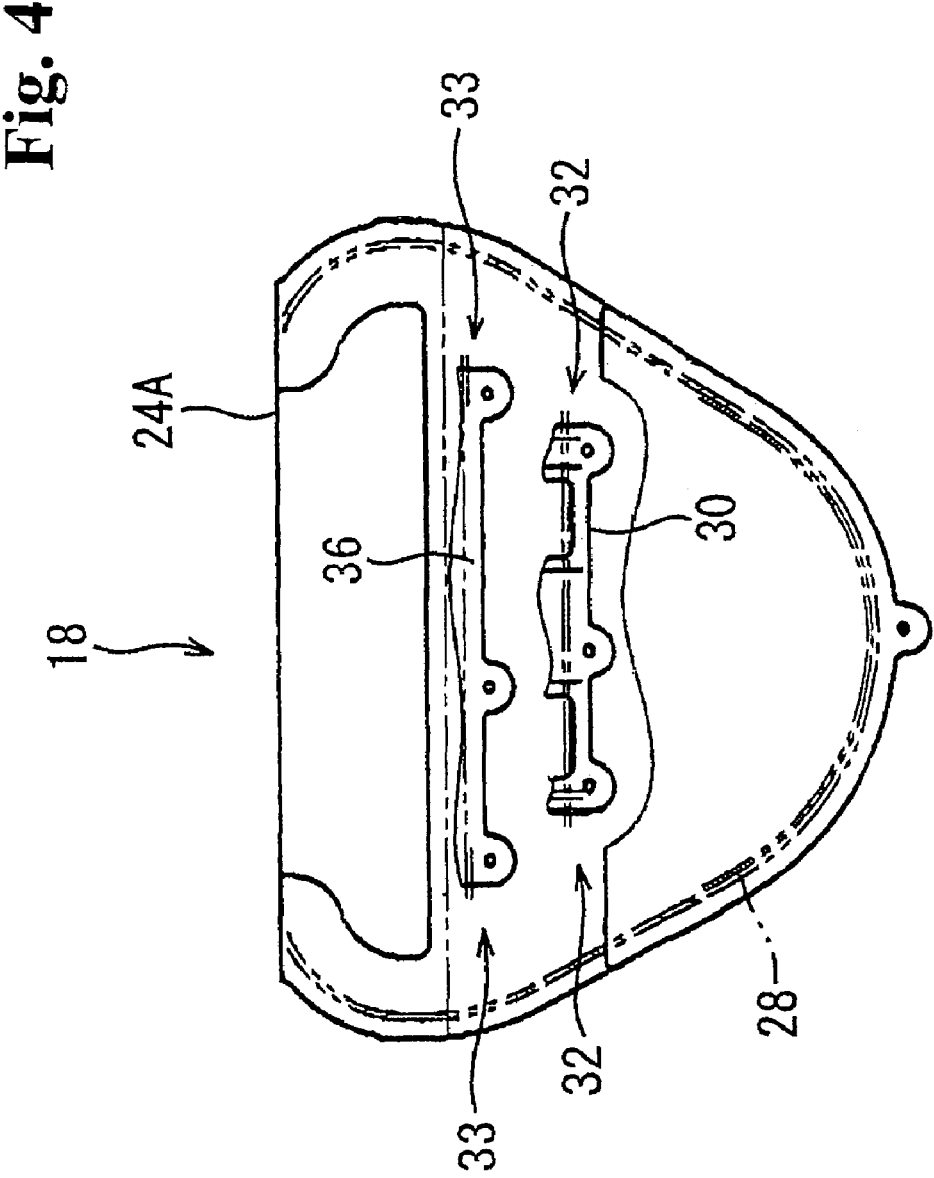

OCCUPANT'S LEG RESTRAINT SYSTEM

BACKGROUND OF THE INVENTION AND RELATED ART STATEMENT

The present invention relates to an occupant's leg restraint system including a knee airbag for preventing the lower legs of an occupant from striking against an interior panel etc. in front of a seat and for restraining the movement of the lower body of the occupant toward the front of the vehicle by restraining the periphery of the knees in the event of a car collision.

There is an occupant's leg restraint system for preventing the lower legs of an occupant from striking against an interior panel in front of a seat in the event of a head-on collision of a high-speed mobile unit such as a car, which includes an airbag disposed inside the interior panel (in the space on the back of the interior panel), a gas generator for inflating the airbag, and a lid that covers the airbag normally, i.e. when the high-speed mobile unit such as a car is not in a collision.

Such an occupant's leg restraint system is generally constructed such that the airbag is disposed in a folded state inside the interior panel, and the lid is mounted so as to cover the folded airbag. When a head-on collision occurs on a car and so on, the gas generator ejects gas. The gas is supplied to the airbag to open the lid with the inflation of the airbag. This permits the airbag to inflate to the exterior of the interior panel to deploy between the interior panel and the lower legs of the occupant, thereby preventing the occupant's lower legs from striking against the interior panel (hereinafter, this type of airbag that inflates forward of occupant's legs is referred to as a knee airbag).

As an example, the knee airbag includes a belt-like tether connecting the facing inner surfaces of the airbag across the width of the airbag to limit the thickness of the airbag during inflation, as disclosed in, for example, Japanese Unexamined Patent Application Publication No. 2005-75142.

With the related-art knee airbag, the gas ejected from the gas generator during inflation directly hits the tether. In this case, with a gas generator that emits gas using powder, the emitted gas becomes very hot, and thus, the direct ejection of gas against the tether may exert an influence on the sewing thread for sewing the tether and the bag together.

Accordingly, it is an object of the present invention to provide an occupant's leg restraint system in which the tether disposed in the airbag is protected from the gas ejected from the gas generator.

Other objects and advantages of the invention are apparent from the following description of the invention.

SUMMARY OF THE INVENTION

In order to achieve the above object, according to a first aspect of the invention, there is provided an occupant's leg restraint system including an airbag that is inflated forward of the legs of an occupant in a vehicle and a gas generator that ejects gas to inflate the airbag. The restraint system includes at least one tether sewn to the interior of the airbag; and a tether protection member disposed between the gas generator and the tether in the airbag.

According to the first aspect of the invention, a tether protection member is disposed between the gas generator and the tether in the airbag. This enables the gas generated from the gas generator during inflation of the airbag to be received by the tether protection member, thereby preventing direct hit of the gas with the tether. This can prevent a possible bad influence to the sewing thread that sews up the tether and the airbag by the direct contact of the high-temperature gas from the gas generator with the tether. Accordingly, the tether disposed in the airbag can be protected from the gas from the gas generator.

According to a second aspect of the invention, the tether protection member in the first aspect of invention is at least one ground fabric made of a material similar to the airbag.

According to the second aspect of the invention, the tether protection member is made of a ground fabric of a material similar to the airbag. This facilitates sewing the tether protection member to the airbag. Also, the airbag can be housed in a folded state inside the interior panel, with the tether protection member housed in the airbag.

According to a third aspect of the invention, the ground fabric is shaped like a belt having a width sufficient to cover at least a part of the tether.

According to the third aspect of the invention, the tether protection member is made of a belt-like ground fabric having a width sufficient to cover at least a part of the tether. The use of the tether protection member made of a belt-like fabric with a specified width can prevent the direct contact of the gas ejected from the gas generator with the tether by the belt-like fabric at the position where the gas collides with the tether.

According to a fourth aspect of the invention, the ground fabric in the second or third aspect of the invention has slack when coming into contact with the tether by the gas generated from the gas generator at the inflation of the airbag.

According to the fourth aspect of the invention, the ground fabric serving as the tether protection member is disposed so as to have at least slack when inflated by the gas ejected from the gas generator at the inflation of the airbag to come into contact with the tether. This arrangement can prevent the overstretch of the fabric at the inflation of the airbag to apply tension to the airbag. As a result, the tether can be protected from the gas from the gas generator without obstruction to the function of the tether to limit the thickness of the airbag.

According to a fifth aspect of the invention, the tether protection member in one of the first to fourth aspects of the invention has a channel for the gas generated from the gas generator.

This arrangement can prevent the direct contact of the gas from the gas generator with the tether, and prevent the obstruction to the deployment of the airbag by allowing the gas to flow downstream through the channel.

According to a sixth aspect of the invention, the gas generator ejects gas using powder or explosive.

The sixth aspect of the invention uses a gas generator that ejects gas with powder. Since the gas generator generates gas by reaction of a gas generating agent using the heat of ignited powder, the gas becomes very hot. Thus, the advantage of tether protection of the invention using the tether protection member becomes more effective. This arrangement can reduce the size of the gas generator in comparison with a high-pressure gas generator.

According to the invention, the tether disposed in the airbag can be protected from the gas ejected from the gas generator.

BRIEF DESCRIPTION OF THE DRAWINGS

FIG. 4 is a cross-sectional view taken along line 4-4 of FIG. 3.

DETAILED DESCRIPTION OF PREFERRED EMBODIMENTS

Figure 1:
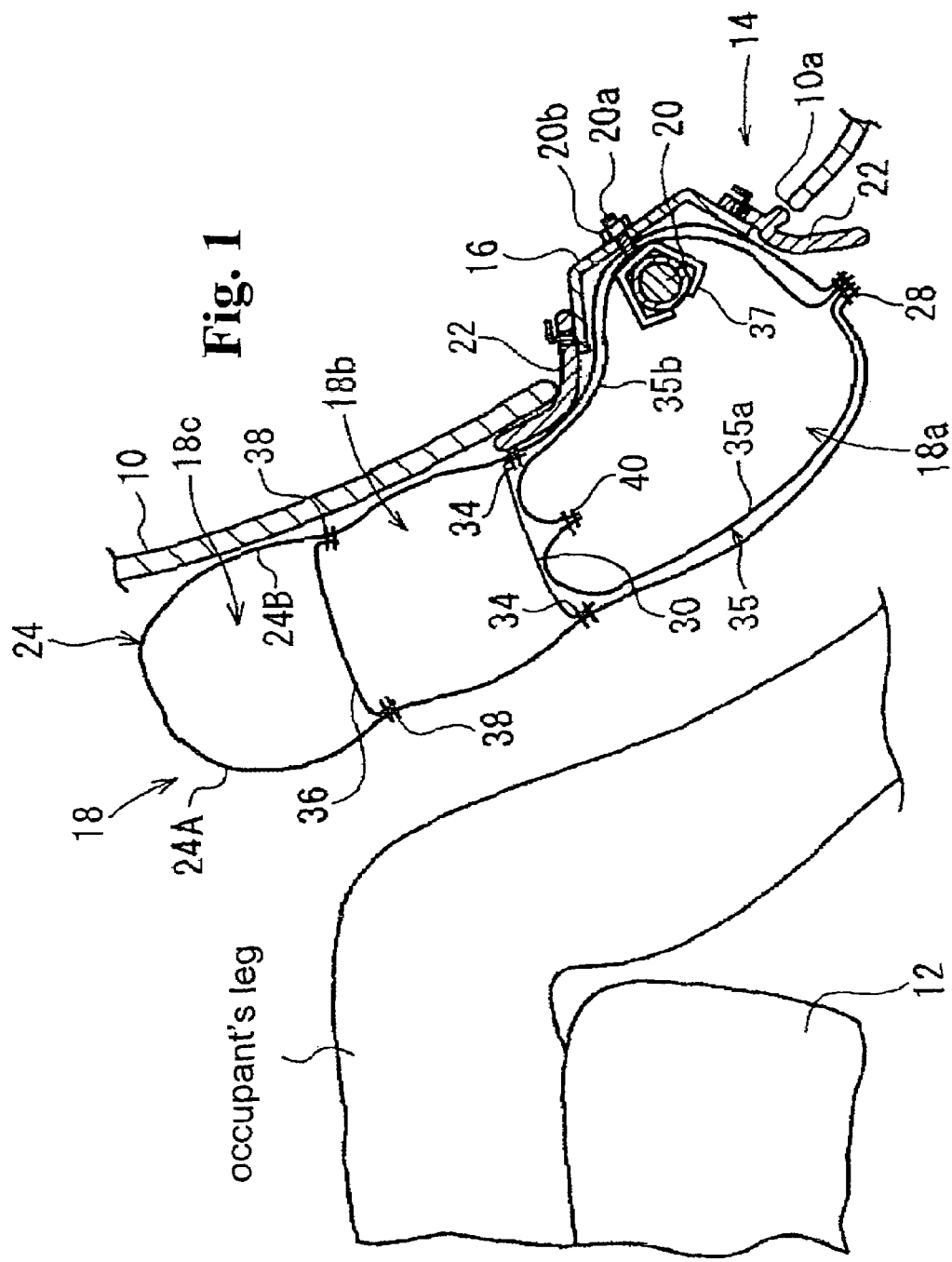
FIG. 1 is a sectional view of the vicinity in front of a vehicle seat, showing the inflating state of a knee airbag of an occupant's leg restraint system according to an embodiment of the present invention.
Figure 2:
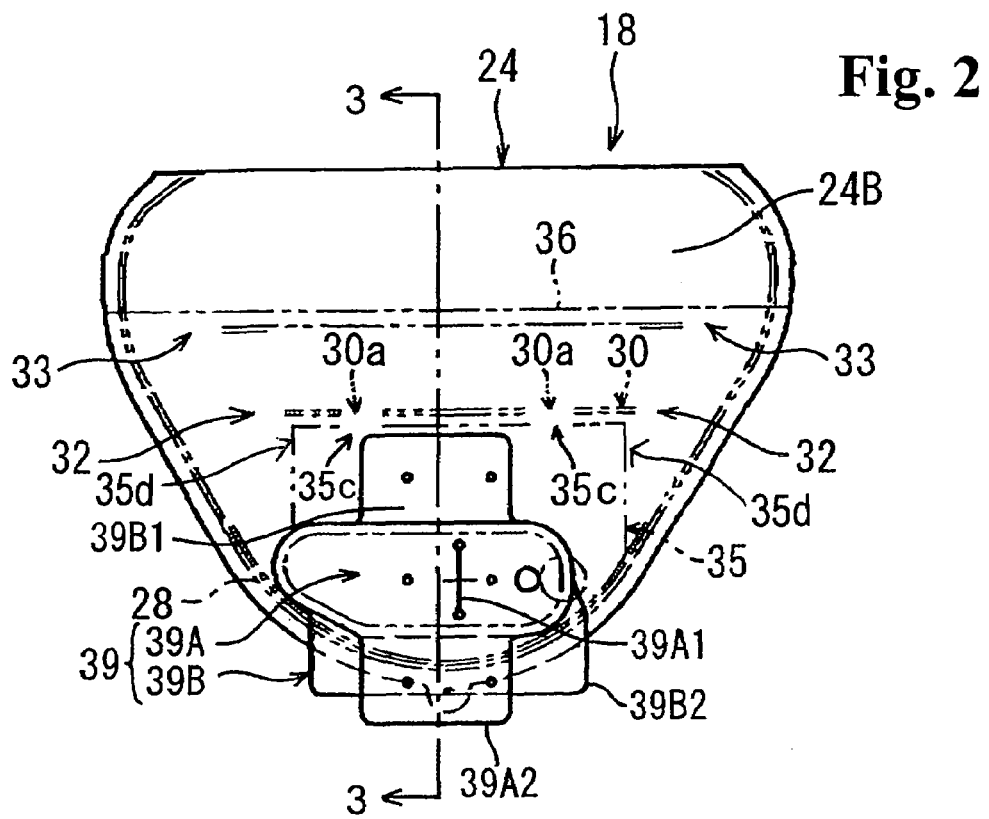
FIG. 2 is a front or plan view of the knee airbag of the occupant's leg restraint system according to the embodiment, viewed from an interior panel.
Figure 3:
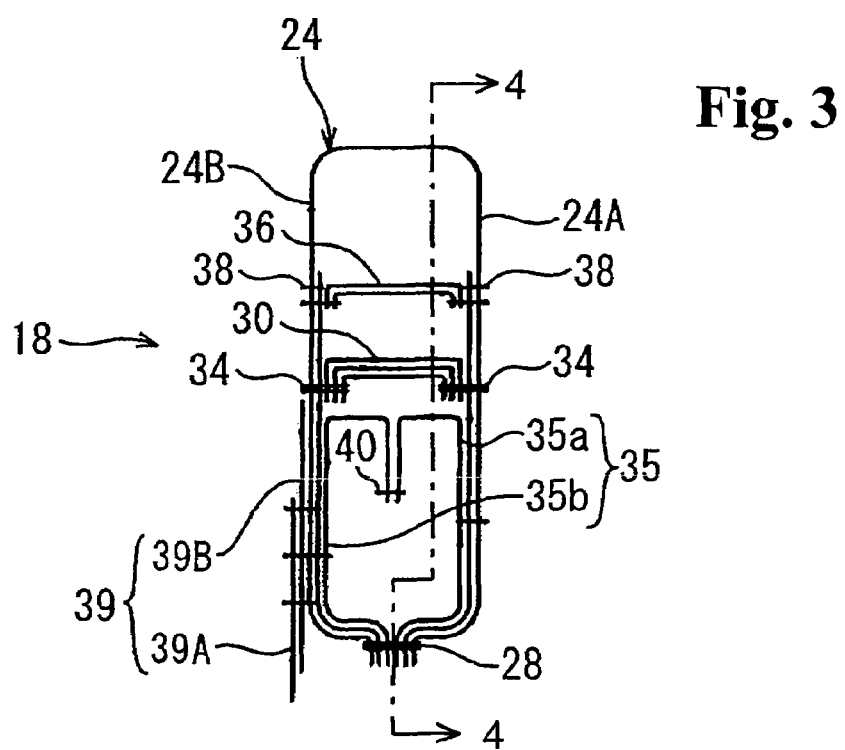
FIG. 3 is a sectional view taken along line 3-3 of FIG. 2.

An embodiment of the present invention will be described hereinbelow with reference to the drawings. FIG. 1 is a sectional view of the vicinity in front of a vehicle seat, showing the inflating state of a knee airbag of an occupant's leg restraint system according to an embodiment of the present invention; FIG. 2 is a front view (plan view) of the knee airbag viewed from an interior panel; FIG. 3 is a sectional view taken along line 3-3 of FIG. 2; and FIG. 4 is a cross-sectional view taken along line 4-4 of FIG. 3. The lateral direction in the following description denotes a vehicle width direction.

An occupant's leg restraint system 14 is mounted to an interior panel 10 serving as an interior trim member in front of a seat 12.

The occupant's leg restraint system 14 includes a container-like retainer 16, a knee airbag 18 (airbag) connected to the interior of the retainer 16, and a gas generator 20 for inflating the knee airbag 18. The retainer 16 is disposed in an opening 10a of the interior panel 10. The knee airbag 18 is usually accommodated in a folded state in the retainer 16. A lid 22 is mounted to the front surface of the retainer 16 such that it covers the knee airbag 18. The lid 22 is usually disposed substantially inside the interior panel 10. When the knee airbag 18 inflates, the lid 22 is open to the front of the interior panel 10 with the upper and lower ends as fulcrum.

In the embodiment, the opening 10a is provided at a height equal to or lower than the seating face of the seat 12. The knee airbag 18 inflates from below to upward along the front surface of the interior panel 10 (the surface adjacent to the occupant) through the opening 10a.

The outer shell of the knee airbag 18 is constructed of one panel 24 having an occupant-side front panel 24A and a rear panel 24B adjacent to the interior panel 10. Referring to FIG. 2, in this embodiment, the panel 24 is constructed such that the front panel 24A and the rear panel 24B substantially triangular in shape and of the same size are connected together. The panel 24 is folded back at the joint portion, and the rims of the front panel 24A and the rear panel 24B except the joint portion are joined together with connecting means such as sewing into a bag. Reference numeral 28 indicates a seam of sewing thread or the like that stitches the rims. One surface of each of the front panel 24A and the rear panel 24B is coated with silicone, which comes inside in the form of a bag.

The knee airbag 18 has two belt-like tethers 30 and 36 sewn therein for preventing an increase in the thickness of the airbag 18 during inflation. The first tether 30 is disposed upstream of the gas flow from the gas generator 20 (below in FIGS. 1 to 4), whose crosswise opposite ends and the facing inner surfaces of the knee airbag 18 are stitched with a sewing thread 38. The second tether 36 is disposed downstream of the gas flow (above in FIGS. 1 to 4), whose crosswise opposite ends and the facing inner surfaces of the knee airbag 18 are also stitched with the sewing thread 38.

As shown in FIGS. 2 and 4, the first tether 30 and the second tether 36 are disposed substantially in the lateral direction (in the vehicle width direction) of the knee airbag 18 to form a first chamber 18a, a second chamber 18b, and a third chamber 18c in the knee airbag 18 in that order from the upper stream of the gas flow (see FIG. 1) Channels 32 and 33 for the gas from the gas generator 20 to pass through are disposed on the opposite ends of the length of the first tether 30 and the second tether 36, respectively. The channel 32 communicates the first chamber 18a and the second chamber 18b with each other, while the channel 33 communicates the second chamber 18b and the third chamber 18c with each other. The first tether 30 has at least one (two in this embodiment) channel 30a for the gas from the gas generator 20 to pass through.

The knee airbag 18 further contains a tether protection member 35 between the gas generator 20 and the first tether 30. As shown in FIG. 2, the tether protection member 35 is a belt-like ground fabric having a width substantially the same as or slightly smaller than the length of the first tether 30 and made of a material similar to the knee airbag 18. The opposite ends are sewn in the front panel 24A and the rear panel 24B with the seam 28, as shown in FIGS. 1 and 3. One surface of the tether protection member 35 is coated with silicone, like the front panel 24A and the rear panel 24B. The coated surface is disposed on the side of the gas generator 20. The tether protection member 35 is constructed such that a plurality of (two in this embodiment) belt-like ground fabrics 35a and 35b are stitched with a sewing thread 40.

As a result, as shown in FIG. 1, the tether protection member 35 is allowed to have at least slight slack when inflated by the gas from the gas generator 20 at the inflation of the knee airbag 18 to come into contact with the first tether 30. The tether protection member 35 has a plurality of (two in this embodiment) channels 35c for the gas from the gas generator 20 to pass through at the position corresponding to the channels 30a of the first tether 30. Thus, a part of the gas from the gas generator 20 flows downstream (toward the second chamber 18b) through the channels 35c of the tether protection member 35 and the channels 30a of the first tether 30. In this embodiment, although the tether protection member 35 is shaped like a belt having a fixed width, it may not necessarily have a fixed width. For example, the portion fixed with the seam 28 may be small in width.

The knee airbag 18 has a gas-generator housing section 39 at the lower part. The gas-generator housing section 39 has a housing bag 39A for housing the gas generator 20 and a protective fabric 39B disposed between the housing bag 39A and the rear panel 24B. The housing bag 39A has a slit 39A1 for the gas generator 20 to take in and out therethrough and a cover 39A2 for closing the slit 39A1 to improve the air-tightness of the housing bag 39A. The protective fabric 39B has a cover 39B1 for closing the slit 39A1, like the cover 39A2 of the housing bag 39A, and a protective portion 39B2 for protecting the knee airbag 18 from the corner (edge) of the retainer 16.

To accommodate the gas generator 20 in this gas-generator housing section 39, the gas generator 20 is first accommodated in the housing bag 39A through the slit 39A1, then the cover 39B1 of the protective fabric 39B is bent toward the gas generator 20 so as to cover the slit 39A1, and then the cover 39A2 of the housing bag 39A is bent toward the gas generator 20 so as to cover the cover 39B1 that covers the slit 39A1. Thus, the slit 39A1 is covered with the covers 39B1 and 39A2 double to improve the air-tightness of the housing bag 39A. The gas-generator housing section 39 is not shown in FIG. 1.

The gas-generator housing section 39 contains the substantially cylindrical gas generator 20 and a metallic gas-generator retaining member 37 (see FIG. 1) for retaining the gas generator 20. The gas generator 20 ejects gas by the reaction of a gas generating agent using the heat of ignited powder. The gas generator 20 is disposed with the axis in the vehicle width direction. As shown in FIG. 1, a stud bolt 20a projects from the side circumferential surface of the gas-generator retaining member 37 that retains the gas generator 20. The stud bolt 20a passes through a bolt insertion opening (not shown) in the bottom of the retainer 16, on which a nut 20b is tightened to fix the gas generator 20 and the gas-generator retaining member 37 to the retainer 16. The rear panel 24B of the knee airbag 18 and the tether protection member 35 are held by the retainer 16 in such a manner as to be sandwiched between the gas generator 20 and the gas-generator retaining member 37 and the bottom of the retainer 16.

The occupant's leg restraint system 14 with this arrangement activates the gas generator 20 in a vehicle collision to generate knee-airbag inflating gas. The gas is supplied into the first chamber 18a to inflate first. At that time, the tether protection member 35 is also inflated to prevent the direct collision or contact of the gas generated from the gas generator 20 with the first tether 30. The inflation of the first chamber 18a allows the lid 22 to open to both sides. Then, the gas in the first chamber 18a flows into the second chamber 18b through the channels 35c of the tether protection member 35 and the channels 30a of the first tether 30 and the channels 32 to inflate the second chamber 18b. The gas in the second chamber 18b then flows into the third chamber 18c through the channels 33 to inflate the third chamber 18c. Thus, the knee airbag 18 is inflated.

The occupant's leg restraint system 14 of the embodiment with this arrangement and operation has the following advantages.

Since the occupant's leg restraint system 14 of the embodiment has the tether protection member 35 between the gas generator 20 and the first tether 30 in the knee airbag 18, as described above, the gas generated from the gas generator 20 at the inflation of the knee airbag 18 hits the tether protection member 35. As a result, direct contact of the gas with the first tether 30 can be prevented. This can prevent melting of the sewing thread 34 that sews up the first tether 30 and the knee airbag 18 by the direct contact of the high-temperature gas from the gas generator 20 with the first tether 30. With the second tether 36, the gas from the gas generator 20 does not hit directly because the gas that has contacted with the tether protection member 35 flows into the second chamber 18b through the channels 32 and then comes into contact. Accordingly, the first and second tethers 30 and 36 disposed in the knee airbag 18 can be protected from the gas from the gas generator 20.

In the occupant's leg restraint system 14 of the embodiment, the tether protection member 35 is made of a ground fabric of a material similar to the knee airbag 18. This facilitates sewing the tether protection member 35 to the knee airbag 18. Also, the knee airbag 18 in a folded state can be housed inside the interior panel 10, with the tether protection member 35 disposed in the knee airbag 18.

In the occupant's leg restraint system 14 of the embodiment, the tether protection member 35 is a belt-like ground fabric having a width substantially equal to the length of the first tether 30, as described above. The use of the tether protection member 35 made of a belt-like fabric with a specified width enables the gas that has collided with the tether protection member 35 to flow through side holes 35d and the channels 32 at the opposite ends into the second chamber 18b, thereby not obstructing the inflation of the knee airbag 18. Furthermore, the use of the tether protection member 35 having substantially the same width as the first tether 30 further prevents the direct collision or contact of the gas from the gas generator 20 with the first tether 30.

As has been described, the occupant's leg restraint system 14 of the embodiment has the tether protection member 35 such that it has at least slight slack when inflated by the gas generated from the gas generator 20 at the inflation of the knee airbag 18 to come into contact with the first tether 30. This arrangement can prevent the overstretch of the tether protection member 35 at the inflation of the knee airbag 18 to apply tension to the knee airbag 18. In other words, the tether protection member 35 itself functions as a tether. As a result, the tethers can be protected from the gas from the gas generator 20 without obstruction to the function of the first and second tethers 30 and 36 to limit the thickness of the knee airbag 18.

In the occupant's leg restraint system 14 of the embodiment, as described above, the first tether 30 has the channels 30a for the gas from the gas generator 20 to pass through and the tether protection member 35 has the channels 35c at the position corresponding to the channels 30a.

This arrangement can prevent the direct contact of the gas from the gas generator 20 with the first tether 30, and prevent the obstruction to the deployment of the knee airbag 18 by allowing a part of the gas from the gas generator 20 to flow downstream (toward the second chamber 18b) through the channels 35c of the tether protection member 35 and the channels 30a of the first tether 30.

The occupant's leg restraint system 14 of the embodiment uses the gas generator 20 that generates gas using powder, as described above. In other words, since the gas generated from the gas generator 20 becomes very hot, the advantage of tether protection of the embodiment using the tether protection member 35 becomes more effective. This arrangement can reduce the size of the gas generator in comparison with a high-pressure gas generator.

The invention has been described with reference to the arrangement having only one tether protection member 35 in the knee airbag 18 by way of example. The invention is not limited to that, but may have two or more tether protection members. For example, belt-like ground fabrics may be disposed in layers or side by side. This arrangement also offers the same advantages.

The invention has been described using the example of application to the occupant's leg restraint system including the gas generator 20 that generates high-temperature gas using powder. The invention is not limited to that, but may be applied to an occupant's leg restraint system including a gas generator that generates high-pressure gas such as argon. In this case, receiving of the high-pressure gas generated from the gas generator by the tether protection member reduces the impact to the tether in comparison with the case in which the high-pressure gas directly hits the tether. In other words, the impact during the contact of gas can be reduced also when the gas is not at high temperature. Accordingly, this arrangement offers the same advantage as the foregoing embodiment that the tether can be protected from the gas from the gas generator.

The disclosure of Japanese Patent Application No. 2005-308207 filed on Oct. 24, 2005 is incorporated herein as a reference.

While the invention has been explained with reference to the specific embodiments of the invention, the explanation is illustrative, and the invention is limited only by the appended claims.

What is claimed is:

1. An occupant's leg restraint system comprising:
an airbag to be inflated toward legs of an occupant in a vehicle, said airbag having upper and lower sides when the airbag is inflated, a rim and a seam at the lower side for sewing the rim,
a gas generator for ejecting gas to inflate the airbag,
at least one tether sewn to the airbag and located inside the airbag, and a tether protection member disposed between the gas generator and the tether in the airbag and connected to the rim of the airbag by the seam, said tether protection member covering the at least one tether at a side of the gas generator to protect the tether from the gas ejected from the gas generator.

2. An occupant's leg restraint system according to claim 1, wherein the tether protection member includes at least one ground fabric made of a material same as or similar to the airbag.

3. An occupant's leg restraint system according to claim 1, wherein the tether protection member has a belt shape having a width for covering at least a part of the tether.

4. An occupant's leg restraint system according to claim 1, wherein the tether protection member has slack when contacting the tether by the gas ejected from the gas generator upon inflation of the airbag.

5. An occupant's leg restraint system according to claim 1, wherein the tether protection member has a channel for the gas generated from the gas generator.

6. An occupant's leg restraint system according to claim 1, wherein the gas generator generates the gas using powder.

7. An occupant's leg restraint system according to claim 1, wherein said tether protection member has an elongated shape and made of a heat resistant flexible material, said tether protection member being located at a side directly facing the gas generator adjacent to a connecting portion where the tether is connected to the airbag by threads to protect the threads from the gas ejected from the gas generator.

8. An occupant's leg restraint system according to claim 7, wherein said tether protection member has side holes, and a plurality of channels between the side holes, said side holes being located at portions not facing the tether to allow the gas to flow therethrough.

9. An occupant's leg restraint system according to claim 1, wherein the tether protection member faces the gas generator so that the gas ejected from the gas generator does not directly contact the at least one tether.

10. An occupant's leg restraint system according to claim 9, wherein the tether protection member has a belt shape containing the gas generator therein.

11. An occupant's leg restraint system according to claim 8, wherein said at least one tether has a plurality of channels facing the channels of the tether protection member.

* * * * *